(12) United States Patent
Deshmukh et al.

(10) Patent No.: US 12,499,180 B2
(45) Date of Patent: Dec. 16, 2025

(54) SYSTEMS AND METHODS FOR DATA AUGMENTATION

(71) Applicant: ADOBE INC., San Jose, CA (US)

(72) Inventors: Shripad Vilasrao Deshmukh, Maharashtra (IN); Surgan Jandial, Jammu Kashmir (IN); Abhinav Java, Uttar Pradesh (IN); Milan Aggarwal, Delhi (IN); Mausoom Sarkar, New Delhi (IN); Arneh Jain, Kerala (IN); Balaji Krishnamurthy, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 361 days.

(21) Appl. No.: 18/045,542

(22) Filed: Oct. 11, 2022

(65) Prior Publication Data

US 2024/0119122 A1    Apr. 11, 2024

(51) Int. Cl.
*G06F 18/2411* (2023.01)
*G06F 16/28* (2019.01)
(Continued)

(52) U.S. Cl.
CPC ........ *G06F 18/2411* (2023.01); *G06F 16/285* (2019.01); *G06F 16/35* (2019.01);
(Continued)

(58) Field of Classification Search
CPC ............... G06F 18/2411; G06F 18/245; G06F 18/2155; G06F 18/2431; G06F 18/243; G06F 18/24; G06F 18/25; G06F 18/251; G06F 18/254; G06F 18/285; G06F 16/906; G06F 18/24147; G06F 16/55; G06F 2218/12; G06F 16/285; G06F 16/355; G06F 16/35; G06F 16/353; G06F 18/24155;
(Continued)

(56) References Cited

U.S. PATENT DOCUMENTS 11,610,393 B2 *   3/2023  Kuen ..................... G06T 3/60
11,861,762 B2 *   1/2024  Li ........................ G06T 11/60
(Continued)

FOREIGN PATENT DOCUMENTS

EP    3582142 A1 * 12/2019 ........... G06K 9/4628

OTHER PUBLICATIONS

Ullah et al., Design and Evaluation of Object Classifiers for Probabilistic Decision-Making in Autonomous Systems, May 23-27, 2022 [retrieved Nov. 27, 2024], 2022 International Conference on Robotics and Automation (ICRA), pp. 7096-7102. DOI: 10.1109/ICRA46639.2022.9812171 (Year: 2022).*
(Continued)

*Primary Examiner* — Henok Shiferaw
*Assistant Examiner* — Dennis Rosario
(74) *Attorney, Agent, or Firm* — F. CHAU & ASSOCIATES, LLC

(57) ABSTRACT

Systems and methods for data augmentation are provided. One aspect of the systems and methods include receiving an image that is misclassified by a classification network; computing an augmentation image based on the image using an augmentation network; and generating an augmented image by combining the image and the augmentation image, wherein the augmented image is correctly classified by the classification network.

15 Claims, 10 Drawing Sheets

(51) Int. Cl.

| | | |
|---|---|---|
| G06F 16/35 | (2025.01) | |
| G06F 16/353 | (2025.01) | |
| G06F 16/55 | (2019.01) | |
| G06F 16/906 | (2019.01) | |
| G06F 18/214 | (2023.01) | |
| G06F 18/24 | (2023.01) | |
| G06F 18/243 | (2023.01) | |
| G06F 18/245 | (2023.01) | |
| G06F 18/25 | (2023.01) | |
| G06N 3/02 | (2006.01) | |
| G06N 3/045 | (2023.01) | |
| G06N 3/0464 | (2023.01) | |
| G06N 3/0475 | (2023.01) | |
| G06N 3/08 | (2023.01) | |
| G06N 20/00 | (2019.01) | |
| G06T 3/4038 | (2024.01) | |
| G06T 5/50 | (2006.01) | |
| G06V 10/10 | (2022.01) | |
| G06V 10/70 | (2022.01) | |
| G06V 10/764 | (2022.01) | |
| G06V 10/80 | (2022.01) | |
| G06V 10/82 | (2022.01) | |
| G06V 20/20 | (2022.01) | |
| G06V 30/19 | (2022.01) | |
| G06V 40/16 | (2022.01) | |
| G06F 18/2431 | (2023.01) | |

(52) U.S. Cl.
CPC ............ *G06F 16/353* (2019.01); *G06F 16/55* (2019.01); *G06F 16/906* (2019.01); *G06F 18/2155* (2023.01); *G06F 18/24* (2023.01); *G06F 18/243* (2023.01); *G06F 18/245* (2023.01); *G06F 18/25* (2023.01); *G06F 18/251* (2023.01); *G06F 18/254* (2023.01); *G06N 3/02* (2013.01); *G06N 3/045* (2023.01); *G06N 3/0464* (2023.01); *G06N 3/0475* (2023.01); *G06N 3/08* (2013.01); *G06N 20/00* (2019.01); *G06T 3/4038* (2013.01); *G06T 5/50* (2013.01); *G06V 10/16* (2022.01); *G06V 10/70* (2022.01); *G06V 10/764* (2022.01); *G06V 10/80* (2022.01); *G06V 10/82* (2022.01); *G06V 20/20* (2022.01); *G06V 30/19173* (2022.01); *G06V 30/1918* (2022.01); *G06V 40/172* (2022.01); *G06F 18/2431* (2023.01); *G06T 2207/20084* (2013.01); *G06T 2207/20212* (2013.01); *G06T 2207/20216* (2013.01); *G06T 2207/20221* (2013.01); *G06T 2207/20224* (2013.01); *G06T 2211/00* (2013.01); *G06T 2211/441* (2023.08)

(58) Field of Classification Search
CPC .......... G06F 16/45; G06N 3/08; G06N 3/045; G06N 3/0475; G06N 20/00; G06N 3/02; G06N 3/0464; G06V 10/82; G06V 10/764; G06V 20/20; G06V 40/172; G06V 10/70; G06V 30/1918; G06V 10/80; G06V 30/19173; G06V 10/16; G06V 10/811; G06V 10/774; G06T 2207/20084; G06T 19/006; G06T 5/50; G06T 2207/20221; G06T 2207/20216; G06T 2207/20212; G06T 2207/20224; G06T 3/4038; G06T 7/187; G06T 2211/00; G06T 2211/441
See application file for complete search history.

(56) References Cited

U.S. PATENT DOCUMENTS

| | | | | |
|---|---|---|---|---|
| 2012/0288186 | A1* | 11/2012 | Kohli | .................. G06V 10/772 382/159 |
| 2022/0004827 | A1* | 1/2022 | Liu | .................. G06V 30/19107 |
| 2023/0316536 | A1* | 10/2023 | Lee | ........................... G06T 3/02 |
| 2024/0320562 | A1* | 9/2024 | Ba | ........................ G06V 10/774 |

OTHER PUBLICATIONS

Chan et al., Poison as a Cure: Detecting & Neutralizing Variable-Sized Backdoor Attacks in Deep Neural Networks, Nov. 19, 2019 [retrieved Nov. 27, 2024], Cornell University:arXiv, version: [v1], 26 pages. https://doi.org/10.48550/arXiv.1911.080400 (Year: 2019).*

Jiangsha et al., Data augmentation by a CycleGAN-based extra-supervised model for nondestructive testing, Jan. 31, 2022 [retrieved Apr. 7, 2025], Measurement Science and Technology, vol. 33, No. 4, 12 pages. DOI 10.1088/1361-6501/ac3ec3 (Year: 2022).*

Agarwal, et al., "Estimating Example Difficulty using Variance of Gradients", arXiv preprint arXiv:2008.11600v4 [cs.CV] Jun. 21, 2022, 15 pages.

Feng, et al., "A Survey of Data Augmentation Approaches for NLP", arXiv preprint arXiv:2105.03075v5 [cs.CL] Dec. 1, 2021, 21 pages.

Goodfellow, et al., "Explaining and Harnessing Adversarial Examples", arXiv preprint arXiv:1412.6572v3 [stat. ML] Mar. 20, 2015, 11 pages.

He, et al., "Deep Residual Learning for Image Recognition", arXiv preprint arXiv:1512.03385v1 [cs.CV] Dec. 10, 2015, 12 pages.

Ioffe, et al., "Batch Normalization: Accelerating Deep Network Training by Reducing Internal Covariate Shift", arXiv preprint arXiv:1502.03167v3 [cs.LG] Mar. 2, 2015, 11 pages.

Li, et al., "Learning from Noisy Data with Robust Representation Learning", In 2021 IEEE/CVF International Conference on Computer Vision (ICCV), pp. 9485-9494, 2021, 10 pages.

Liang, et al., "Metashift: A Dataset of Datasets for Evaluating Contextual Distribution Shifts and Training Conflicts", arXiv preprint arXiv:2202.06523v1 [cs.LG] Feb. 14, 2022, 19 pages.

BMa, et al., "Undistillable: Making a Nasty Teacher that CANNOT Teach Students", arXiv preprint arXiv:2105.07381v1 [cs.LG] May 16, 2021, 12 pages.

Ma, et al., "Shufflenet V2: Practical Guidelines for Efficient CNN Architecture Design", arXiv preprint arXiv:1807.11164v1 [cs.CV] Jul. 30, 2018, 19 pages.

Madry, et al., "Towards Deep Learning Models Resistant to Adversarial Attacks", arXiv preprint arXiv:1706.06083v4 [stat.ML] Sep. 4, 2019, 28 pages.

Malinin, et al., "Shifts: A Dataset of Real Distributional Shift Across Multiple Large-Scale Tasks", arXiv preprint arXiv:2107.07455v3 [cs.LG] Feb. 11, 2022, 44 pages.

Mirzadeh, et al., "Improved Knowledge Distillation via Teacher Assistant", arXiv preprint arXiv:1902.03393v2 [cs.LG] Dec. 17, 2019, 11 pages.

Nayak, et al., "DAD: Data-free Adversarial Defense at Test Time", arXiv preprint arXiv:2204.01568v2 [cs.LG] Apr. 8, 2022, 15 pages.

Paiva, et al., "PyHard: a novel tool for generating hardness embeddings to support data-centric analysis", arXiv preprint arXiv:2109.14430v1 [cs.LG] Sep. 29, 2021, 5 pages.

Pulastya, et al., "Assessing the Quality of the Datasets by Identifying Mislabeled Samples", arXiv preprint arXiv:2109.05000v1 [cs.LG] Sep. 10, 2021, 8 pages.

Schwinn, et al., "Exploring Misclassifications of Robust Neural Networks to Enhance Adversarial Attacks", arXiv preprint arXiv:2105.10304v2 [cs.LG] May 25, 2021, 15 pages.

Song, et al., "Learning from Noisy Labels with Deep Neural Networks: A Survey", arXiv preprint arXiv:2007.08199v7 [cs.LG] Mar. 10, 2022, 19 pages.

Su, et al., "Hard Example Guided Hashing for Image Retrieval", arXiv preprint arXiv:2112.13565v1 [cs.CV] Dec. 27, 2021, 26 pages.

(56) References Cited

OTHER PUBLICATIONS

Tripathi, et al., "Learning to Generate Synthetic Data via Compositing", arXiv preprint arXiv:1904.05475v2 [cs.CV] Jul. 8, 2019, 19 pages.
Wang, "Data-Free Knowledge Distillation with Soft Targeted Transfer Set Synthesis", arXiv preprint arXiv:2104.04868v1 [cs.LG] Apr. 10, 2021, 9 pages.
Wong, et al., "Fast is Better than Free: Revisiting Adversarial Training", arXiv preprint arXiv:2001.03994v1 [cs.LG] Jan. 12, 2020, 17 pages.
Xiao, et al., "Generating Adversarial Examples with Adversarial Networks", arXiv preprint arXiv:1801.02610v5 [cs. CR] Feb. 14, 2019, 8 pages.
Yang, et al., "Image Data Augmentation for Deep Learning: A Survey", arXiv preprint arXiv:2204.08610v1 [cs.CV] Apr. 19, 2022, 8 pages.
Yoon, et al., "GAIN: Missing Data Imputation using Generative Adversarial Nets", arXiv preprint arXiv:1806.02920v1 [cs.LG] Jun. 7, 2018, 10 pages.
You, et al., "Handling Missing Data with Graph Representation Learning", arXiv preprint arXiv:2010.16418v1 [cs.LG] Oct. 30, 2020, 15 pages.
Zhang, et al., "IDR: Self-Supervised Image Denoising via Iterative Data Refinement", arXiv preprint arXiv:2111.14358v2 [cs.CV] Mar. 22, 2022, 14 pages.
Zhao, "Data Augmentation for Graph Neural Networks", arXiv preprint arXiv:2006.06830v2 [cs.LG] Dec. 2, 2020, 15 pages.
Zhao, et al., "Missing Value Imputation for Mixed Data via Gaussian Copula", arXiv preprint arXiv:1910.12845v3 [stat.ME] Jun. 16, 2020, 11 pages.
Zhao, et al., "CTAB-GAN: Effective Table Data Synthesizing", arXiv preprint arXiv:2102.08369v2 [cs.LG] May 31, 2021, 11 pages.
Zhong, et al., "Random Erasing Data Augmentation", arXiv preprint arXiv:1708.04896v2 [cs.CV] Nov. 16, 2017, 10 pages.
Zhou, et al., "Learning with Noisy Labels via Sparse Regularization", arXiv preprint arXiv:2108.00192v1 [cs.LG] Jul. 31, 2021, 17 pages.
Zhu, et al., "Hard Sample Aware Noise Robust Learning for Histopathology Image Classification", arXiv preprint arXiv:2112.03694v1 [eess.IV] Dec. 5, 2021, 14 pages.

* cited by examiner

```
Algorithm 1
Given: θ, D
Input: G = {g_{δ,c_j}|c_j ∈ C}, d
for epoch in numEpochs do
    for x in D do
        c_r ← randomSample(C)              ▷ Choose a class randomly
        δ ← g_{δ,c_r}(x)                   ▷ Generate perurbation for class c_r
        x̂ ← x + δ                          ▷ Modify image instance
        L ← L_{CE}(θ(x̂),c_r) + log(d(x)) + log(1 − d(x̂)) + ||δ||_2   ▷ Calculate loss
        g_{δ,c_r}, d ← optimizeWeightsUsingLoss(L)
    end for
end for
Return: G
```

SYSTEMS AND METHODS FOR DATA AUGMENTATION

BACKGROUND

The following relates to data augmentation. A dataset including samples such as images can be used for the development of machine learning systems. The dataset assists in both designing an approach to processing the dataset using the machine learning system and in providing a benchmark to measure the performance of the machine learning system.

However, collecting clean and comprehensible samples for a dataset is time-consuming and computationally expensive. Samples that are available for collection in a dataset may be incomplete, noisy, wrong, or insufficient in number and a machine learning system may not be able to effectively learn from the samples, or to make an effective inference based on the samples. An example of a sample that is not suitable for training a machine learning system or for prompting an effective inference from the machine learning system is an ambiguous sample that the machine learning system is unable to accurately recognize. There is therefore a need in the art for data augmentation systems and techniques that can be used to augment an ambiguous sample such that the ambiguous sample is suitable to be processed by a machine learning system.

SUMMARY

An embodiment of the present disclosure provides data augmentation systems and methods that augment a sample that is or is likely to be improperly recognized by a machine learning system, such as a neural network. In an example, a data augmentation system according to an embodiment of the present disclosure receives a sample that has been incorrectly categorized by a classification network and generates an augmentation for the sample. The augmentation is generated such that when the augmentation is combined with the original sample, the sample is likely to be correctly recognized by the neural network.

By combining the augmentation with the original sample to create an augmented sample, the system thereby provides a sample (e.g., the augmented sample) that is easier for the neural network to recognize, which increases the ability of the neural network to effectively learn and infer from the augmented sample.

A method, apparatus, non-transitory computer readable medium, and system for image augmentation are described. One or more aspects of the method, apparatus, non-transitory computer readable medium, and system include receiving an image that is misclassified by a classification network; computing an augmentation image based on the image using an augmentation network; and generating an augmented image by combining the image and the augmentation image, wherein the augmented image is correctly classified by the classification network.

A method, apparatus, non-transitory computer readable medium, and system for image augmentation are described. One or more aspects of the method, apparatus, non-transitory computer readable medium, and system include receiving a training set comprising a sample and a target prediction for the sample; computing an augmented sample based on the sample and the target prediction using an augmentation network; and training a prediction network based on the augmented sample and the target prediction.

A method, apparatus, non-transitory computer readable medium, and system for image augmentation are described. One or more aspects of the method, apparatus, non-transitory computer readable medium, and system include receiving a training set comprising a sample and a target prediction for the sample; computing an augmented sample based on the sample and the target prediction using an augmentation network; and training the augmentation network based on the sample, the augmented sample, and the target prediction.

DETAILED DESCRIPTION

Figure 1:
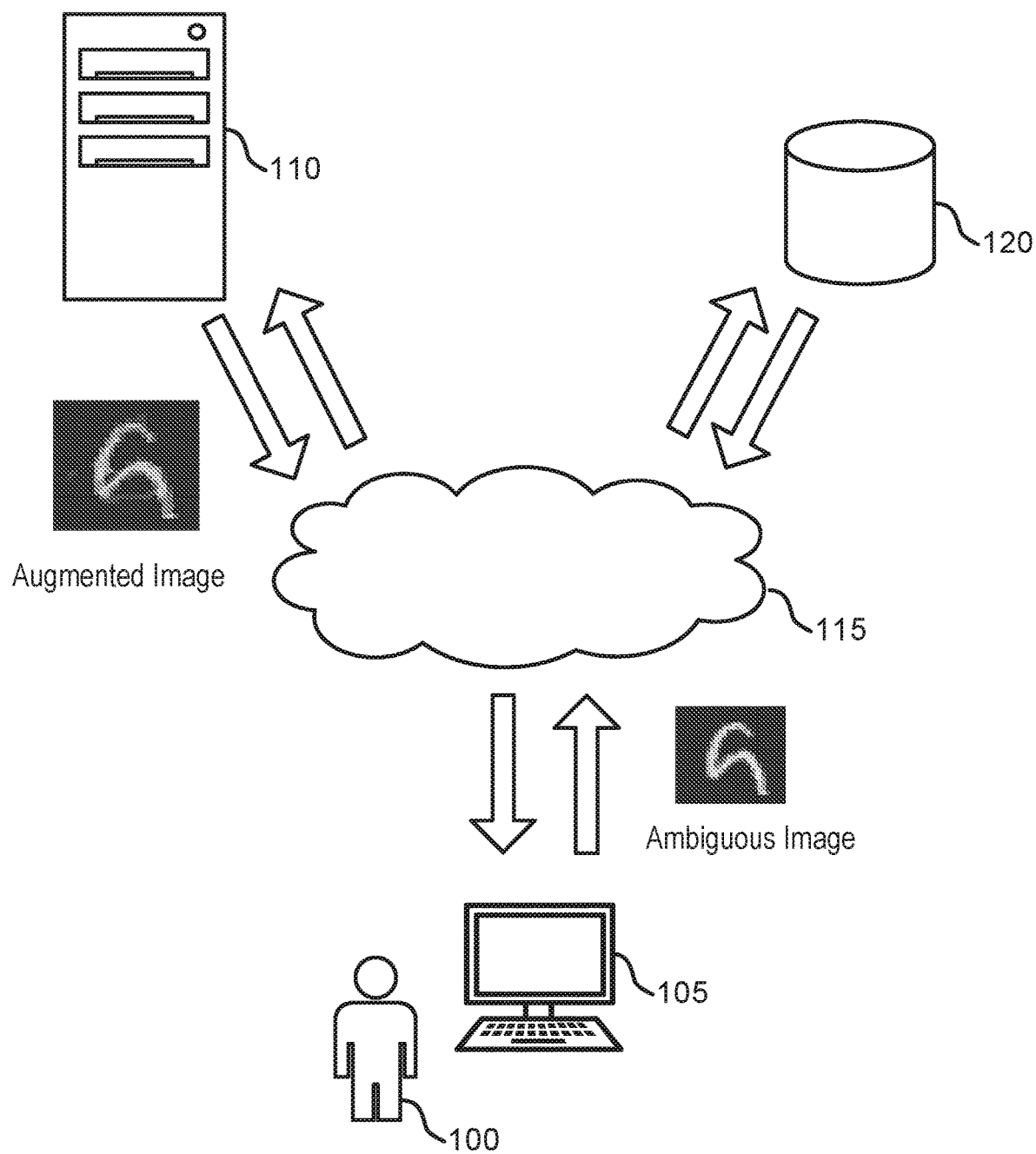
FIG. 1 shows an example of a data augmentation system according to aspects of the present disclosure.

Embodiments of the present disclosure relate to data augmentation. A dataset including samples such as images can be used for the development of machine learning systems. The dataset assists in both designing an approach to processing the dataset using the machine learning system and providing a benchmark to measure the performance of the machine learning system.

However, collecting clean and comprehensible samples for a dataset is time-consuming and computationally expensive. Samples that are available for collection in a dataset may be incomplete, noisy, wrong, or insufficient in number and a machine learning system may not be able to effectively learn from the samples, or to make an effective inference based on the samples. An example of a sample that is not suitable for training a machine learning system or for prompting an effective inference from the machine learning system is an ambiguous sample that the machine learning system is unable to accurately recognize.

According to an aspect of the present disclosure, a data augmentation system is configured to receive an image that is misclassified by a classification network; compute an augmentation image based on the image using an augmentation network; and generate an augmented image by combining the image and the augmentation image, wherein the augmented image is correctly classified by the classification network.

Accordingly, rather than attempting to retrain a classification network using an ambiguous image that is not properly recognized by the machine learning system, which is computationally expensive, an aspect of the present disclosure provides a separate neural network that is configured to add a perturbance to the ambiguous image to obtain an augmented image, such that the augmented image is easily recognized by the classification network. Using the separate neural network to generate the augmented image is less resource-intensive than attempting to retrain the classification network to recognize the ambiguous image. Additionally, it is less resource-intensive and time-consuming to train the separate neural network to generate the augmented image than it is to retrain the classification network, or to manually add or remove images from a training set for the classification network to attempt to account for the ambiguous image.

Furthermore, a data augmentation system according to an aspect of the present disclosure uses an augmented sample (such as the augmented image) to train a prediction network. By computing an augmented sample for an ambiguous sample (such as the misclassified image) and training the prediction network based on the augmented sample, the data augmentation system thereby avoids a manual collection of additional training samples for the training set or a manual removal of training samples from the training set in an attempt to effectively train the prediction network. In addition, in a curriculum learning context, as the training of the prediction network proceeds using the augmented sample, the prediction network is then effectively "primed" to learn from the original ambiguous sample, thereby increasing the effectiveness of the prediction network in making predictions based on ambiguous samples.

According to an aspect of the present disclosure, an example of the data augmentation system is used in an image augmentation context. For example, a classification network may misclassify an image, and a user may wish to alter the image so that it will be correctly classified by the classification network. The user provides the misclassified image to the system, the system augments the image to obtain an augmented image, and the system provides the augmented image to the user. The system thereby provides an easier image for the classification network to classify.

Figure 3:
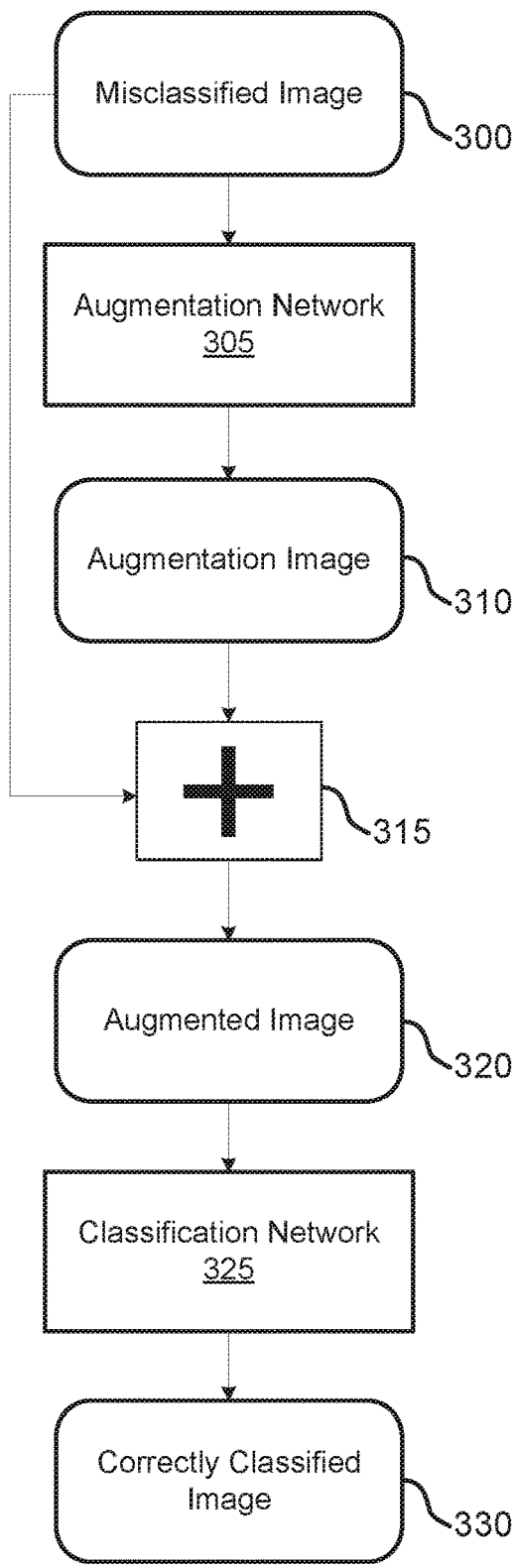
FIG. 3 shows an example of data flow in a data augmentation apparatus according to aspects of the present disclosure.
Figure 4:
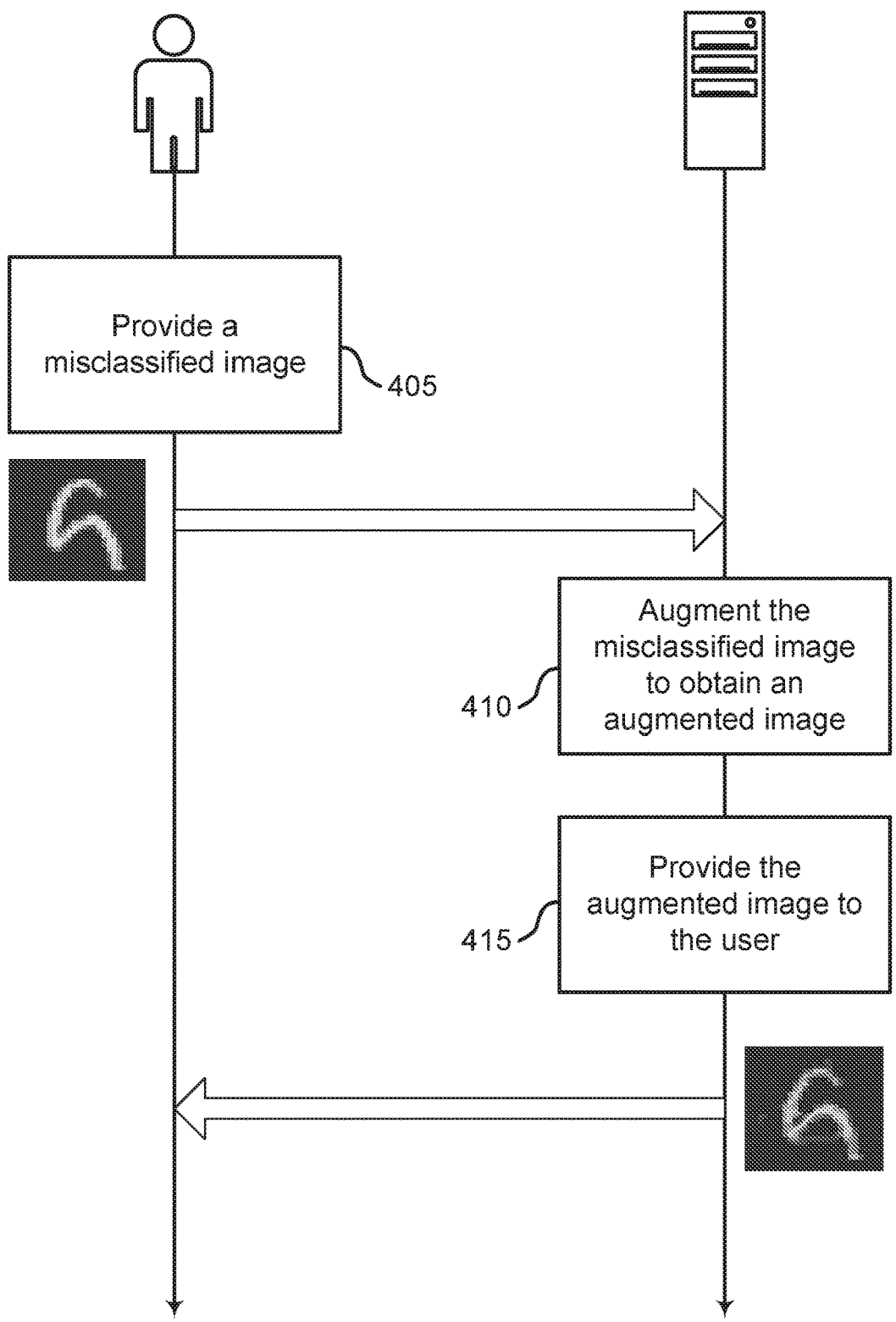
FIG. 4 shows an example of image augmentation according to aspects of the present disclosure.

Example applications of the present disclosure in the image augmentation context are provided with reference to FIGS. 1 and 4. Details regarding the architecture of the system are provided with reference to FIGS. 1-3. Examples of a process for image augmentation are provided with reference to FIGS. 4-7. Examples of a process for training an augmentation network are provided with reference to FIGS. 8-9. Examples of a process for training a prediction network are provided with reference to FIG. 10.

Data Augmentation System

FIG. 1 shows an example of a data augmentation system according to aspects of the present disclosure. The example shown includes user 100, user device 105, data augmentation apparatus 110, cloud 115, and database 120.

Referring to FIG. 1, an example of the data augmentation system is used in an image augmentation context. For example, a classification network may misclassify an image, and user 100 may wish to alter the image so that it will be correctly classified by the classification network. User 100 provides the misclassified image to data augmentation apparatus 110 via user device 105. In some cases, the misclassified image is an ambiguous image. Data augmentation apparatus 110 generates an augmented image based on the misclassified image and provides the augmented image to user 100 via user device 105. The data augmentation system thereby provides an easier image for the classification network to classify. This would allow the classification network to be trained without manually collecting additional training images for a training set or manually removing training images from the training set. In addition, both the augmented image and the misclassified image can be used to construct a curriculum for the classification network, such that the classification network can be effectively "primed" by the augmented image to learn from the original misclassified image, thereby increasing the effectiveness of the classification network in making classifications based on ambiguous images.

According to some aspects, user device 105 is a personal computer, laptop computer, mainframe computer, palmtop computer, personal assistant, mobile device, or any other suitable processing apparatus. In some examples, user device 105 includes software that displays a graphical user interface provided by data augmentation apparatus 110. In some aspects, the graphical user interface allows user 100 to upload or otherwise transfer a file including a sample (such as an image) to data augmentation apparatus 110. In some aspects, the graphical user interface provides samples to user 100.

According to some aspects, a user interface enables user 100 to interact with user device 105. In some embodiments, the user interface may include an audio device, such as an external speaker system, an external display device such as a display screen, or an input device (e.g., a remote-control device interfaced with the user interface directly or through an IO controller module). In some cases, the user interface may be a graphical user interface (GUI).

According to some aspects, data augmentation apparatus 110 includes a computer implemented network. In some embodiments, the computer implemented network includes a machine learning model. In some embodiments, data augmentation apparatus 110 also includes one or more processors, a memory subsystem, a communication interface, an I/O interface, one or more user interface components, and a bus. Additionally, in some embodiments, data augmentation apparatus 110 communicates with user device 105 and database 120 via cloud 115.

In some cases, data augmentation apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Figure 2:
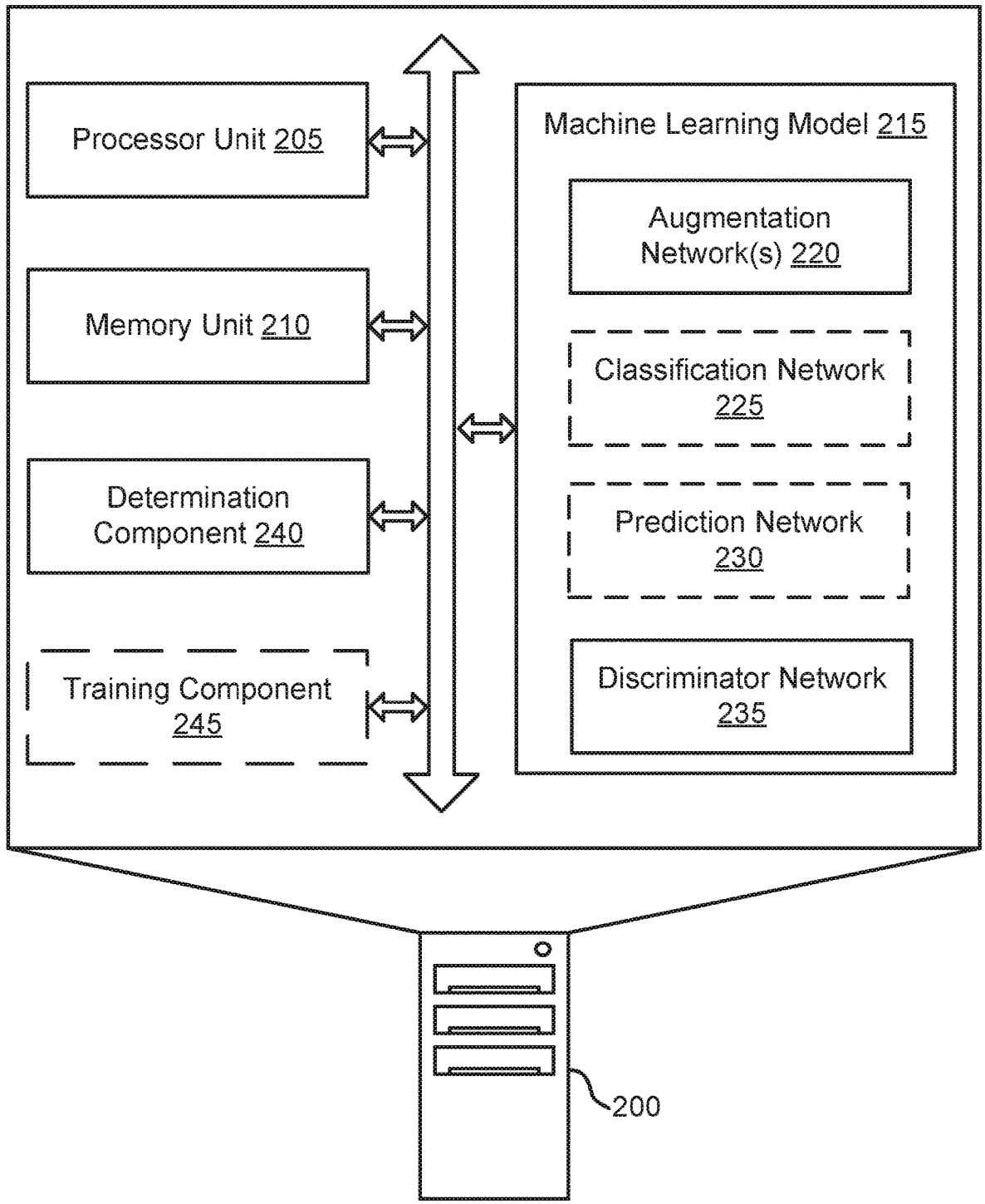
FIG. 2 shows an example of a data augmentation apparatus according to aspects of the present disclosure.

Further detail regarding the architecture of data augmentation apparatus 110 is provided with reference to FIGS. 2-3. Further detail regarding a process for image augmentation is provided with reference to FIGS. 4-7. Further detail regarding a process for training an augmentation network is provided with reference to FIGS. 8-9. Further detail regarding a process for training a prediction network is provided with reference to FIG. 10.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, data augmentation apparatus 110, and database 120.

Database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without interaction from user 100. According to some aspects, database 120 is external to data augmentation apparatus 110 and communicates with data augmentation apparatus 110 via cloud 115. According to some aspects, database 120 is included in data augmentation apparatus 110.

FIG. 2 shows an example of a data augmentation apparatus according to aspects of the present disclosure. The example shown includes data augmentation apparatus 200, determination component 240, and training component 245. In one aspect, data augmentation apparatus 200 includes processor unit 205, memory unit 210, and machine learning model 215. In some aspects, the machine learning model 215 includes augmentation network(s) 220, classification network 225, prediction network 230, and discriminator network 235.

According to some aspects, processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special-purpose components for modem processing, baseband processing, digital signal processing, or transmission processing.

According to some aspects, memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, machine learning model 215 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, machine learning model 215 is implemented as one or more hardware circuits, as firmware, as software stored in memory unit 210 and executable by processor unit 205, or as a combination thereof. In one aspect, machine learning model 215 includes augmentation network(s) 220, classification network 225, prediction network 230, and discriminator network 235. According to some aspects, each of augmentation network(s) 220, classification network 225, prediction network 230, and discriminator network 235 includes one or more ANNs.

According to some aspects, augmentation network 220 receives an image that is misclassified by a classification network 225. In some examples, augmentation network 220 computes an augmentation image based on the image using an augmentation network 220. In some examples, augmentation network 220 generates an augmented image by combining the image and the augmentation image, where the augmented image is correctly classified by the classification network 225. In some examples, the image depicts an object that is misclassified by the classification network 225, and where the augmented image depicts an augmented object that is correctly classified by the classification network 225.

According to some aspects, augmentation network 220 computes an augmented sample based on the sample and the target prediction using an augmentation network 220. In some examples, augmentation network 220 computes augmentation data using the augmentation network 220. In some examples, augmentation network 220 combines the sample with the augmentation data to obtain the augmented sample.

According to some aspects, augmentation network 220 computes an augmented sample based on the sample and the target prediction using an augmentation network 220. In some aspects, the augmentation network 220 is a generator network of a generative adversarial network.

According to some aspects, machine learning model 215 includes a generative adversarial network (GAN). A GAN is a category of ANN in which one or more generator networks and a discriminator network are trained based on a contest with each other. For example, given a training set, the GAN learns to generate new data with similar properties as the training set. In an example, a GAN trained on photographs can generate new images that look like authentic photographs to a human observer. GANs may be used in conjunction with supervised learning, semi-supervised learning, unsupervised learning, and reinforcement learning. In some examples, the generator network generates candidates while the discriminator network evaluates the generated candidates. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

According to some aspects, augmentation network 220 is the generator network of the GAN. According to some aspects, machine learning model 215 includes a set of augmentation networks 220, and each of the set of augmentation networks 220 is a generator network for the GAN.

Augmentation network(s) 220 are an example of, or includes aspects of, the corresponding element described with reference to FIG. 3. Augmentation network(s) 220 are implemented as one or more hardware circuits, as firmware, as software stored in memory unit 210 and executable by processor unit 205, or as a combination thereof.

According to some aspects, classification network 225 classifies the image using the classification network 225 to obtain a false label. In some examples, classification network 225 classifies the augmented image using the classification network 225 to obtain a correct label.

According to some aspects, classification network 225 comprises one or more ANNs configured to classify an object depicted in an image. An example of an ANN suitable to classify an object depicted in an image is a convolutional neural network (CNN). A CNN is a class of neural network that is commonly used in computer vision or image classification systems. In some cases, a CNN may enable a processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Classification network 225 is an example of, or includes aspects of, the corresponding element described with reference to FIG. 3. According to some aspects, classification network is implemented as prediction network 230. According to some aspects, classification network 225 is implemented as one or more hardware circuits, as firmware, as software stored in memory unit 210 and executable by processor unit 205, or as a combination thereof.

According to some aspects, classification network 225 is omitted from data augmentation apparatus 200. According to some aspects, classification network 225 is included in a separate apparatus from data augmentation apparatus 200 and communicates with data augmentation apparatus 200 to perform the functions described herein. According to some aspects, classification network 225 is implemented as one or more hardware circuits, as firmware, as software stored in memory of the external device and executable by a processor of the external device, or as a combination thereof.

According to some aspects, prediction network 230 generates a predicted value for the sample using the prediction network 230. According to some aspects, prediction network 230 generates a predicted value for the sample using a prediction network 230.

According to some aspects, prediction network 230 comprises one or more ANNs configured to generate a predicted value for a sample. In some cases, the predicted value is a numerical representation of the likelihood that the sample comprises data of a certain type. An example of an ANN suitable to generate a predicted value for a sample is a CNN. According to some aspects, prediction network 230 is implemented as one or more hardware circuits, as firmware, as software stored in memory unit 210 and executable by processor unit 205, or as a combination thereof.

According to some aspects, prediction network 230 is omitted from data augmentation apparatus 200. According to some aspects, prediction network 230 is included in a separate apparatus from data augmentation apparatus 200 and communicates with data augmentation apparatus 200 to perform the functions described herein. According to some aspects, prediction network 230 is implemented as one or more hardware circuits, as firmware, as software stored in memory of the external device and executable by a processor of the external device, or as a combination thereof.

According to some aspects, discriminator network 235 computes a discrimination value based on the augmented sample using a discriminator network 235. According to some aspects, discriminator network 235 is implemented as the discriminator network of the GAN of machine learning model 215. According to some aspects, the set of augmentation networks 220 is implemented as a set of generator networks in the GAN, and each of the set of augmentation networks 220 uses discriminator network 235 in common. According to some aspects, discriminator network 235 is implemented as one or more hardware circuits, as firmware, as software stored in memory unit 210 and executable by processor unit 205, or as a combination thereof.

According to some aspects, determination component 240 determines that the image is misclassified based on the false label, where the augmentation image is computed based on the determination. In some examples, determination component 240 identifies a label for the image. In some examples, determination component 240 selects the augmentation network 220 from among a set of augmentation networks 220 based on the label.

According to some aspects, determination component 240 randomly selects the target prediction from a set of prediction values. In some examples, determination component 240 selects the augmentation network 220 from a set of augmentation networks 220 based on the target prediction.

According to some aspects, determination component 240 is implemented as one or more hardware circuits, as firmware, as software stored in memory unit 210 and executable by processor unit 205, or as a combination thereof.

According to some aspects, training component 245 trains classification network 225 based on the augmented image.

According to some aspects, training component 245 receives a training set including a sample and a target prediction for the sample. In some cases, training component 245 trains prediction network 230 based on the augmented sample and the target prediction. In some examples, training component 245 computes a prediction loss for prediction network 230 by comparing the predicted value and the target prediction, where prediction network 230 is trained based on the prediction loss.

According to some aspects, training component 245 receives a training set including a sample and a target prediction for the sample. According to some aspects, training component 245 trains augmentation network 220 based on the sample, the augmented sample, and the target prediction. In some examples, training component 245 computes an augmentation loss based on the augmented sample and the discrimination value, where augmentation network 220 is trained based on the augmentation loss.

In some examples, training component 245 trains discriminator network 235 based on the discrimination value. In some examples, training component 245 computes a cross-entropy loss based on the augmented sample and the predicted value, where augmentation network 220 is trained based on the cross-entropy loss. In some examples, training component 245 freezes prediction network 230 while augmentation network 220 is trained.

In some examples, training component 245 determines a logarithm of a function of the sample, where augmentation network 220 is trained based on the logarithm of the function of the sample. In some examples, training component 245 determines a logarithm of a function of the augmented sample, where augmentation network 220 is trained based on the logarithm of the function of the augmented sample. In some examples, training component 245 determines a Euclidean norm of an augmented portion of the augmented sample, where augmentation network 220 is trained based on the Euclidean norm of the augmented portion.

According to some aspects, training component 245 is implemented as one or more hardware circuits, as firmware, as software stored in memory unit 210 and executable by processor unit 205, or as a combination thereof. According to some aspects, training component 245 is omitted from data augmentation apparatus 200. According to some aspects, training component 245 is included in a separate apparatus from data augmentation apparatus 200 and communicates with data augmentation apparatus 200 to perform the functions described herein. According to some aspects, training component 245 is implemented as one or more hardware circuits, as firmware, as software stored in memory of the external device and executable by a processor of the external device, or as a combination thereof.

FIG. 3 shows an example of data flow in a data augmentation apparatus according to aspects of the present disclosure. The example shown includes misclassified image 300, augmentation network 305, augmentation image 310, combination step 315, augmented image 320, classification network 325, and correctly classified image 330.

Misclassified image 300 is an example of, or includes aspects of, the corresponding element described with reference to FIG. 7. Augmentation network 305 is an example of, or includes aspects of, the corresponding element described with reference to FIG. 2. Classification network 325 is an example of, or includes aspects of, the corresponding element described with reference to FIG. 2.

In the example of FIG. 3, augmentation network 305 receives misclassified image 300 and generates augmentation image 310 in response. Augmentation network 305 then combines misclassified image 300 and augmentation image 310 in combination step 315 to obtain augmented image 320. Augmentation network 305 provides augmented image 320 to classification network 325. Classification network classifies augmented image 320 to obtain correctly classified image 330.

Image Augmentation

A method for data augmentation is described with reference to FIGS. 4-7. One or more aspects of the method include receiving an image that is misclassified by a classification network; computing an augmentation image based on the image using an augmentation network; and generating an augmented image by combining the image and the augmentation image, wherein the augmented image is correctly classified by the classification network.

Some examples of the method further include classifying the image using the classification network to obtain a false label. Some examples further include determining that the image is misclassified based on the false label, wherein the augmentation image is computed based on the determination.

Some examples of the method further include classifying the augmented image using the classification network to obtain a correct label. Some examples of the method further include training the classification network based on the augmented image.

In some aspects, the image depicts an object that is misclassified by the classification network, and wherein the augmented image depicts an augmented object that is correctly classified by the classification network. Some examples of the method further include identifying a label for the image. Some examples further include selecting the augmentation network from among a plurality of augmentation networks based on the label.

FIG. 4 shows an example of image augmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, an example of the system is used in an image augmentation context. For example, a classification network may misclassify an image, and a user may wish to alter the image so that it will be correctly classified by the classification network. The user provides the misclassified image to the system, the system augments the image to obtain an augmented image, and the system provides the augmented image to the user. The system thereby provides an easier image for the classification network to classify, allowing the classification network to learn from an easier image rather than the more difficult original image. This would allow the classification network to be trained without manually collecting additional training images for a training set or manually removing training images from the training set. In addition, both the augmented image and the original image can be used to construct a curriculum for the classification network, such that the classification network can be effectively "primed" by the augmented image to learn from the original ambiguous image, thereby increasing the effectiveness of the classification network in making classifications based on ambiguous images.

At operation 405, the user provides a misclassified image. In some cases, the misclassified image is an ambiguous image. In some cases, the operations of this step refer to, or may be performed by, a user as described with reference to FIG. 1. For example, in some cases, the misclassified image is an image that was misclassified by a classification network as described with reference to FIG. 5. For example, the misclassified image depicts an object that the classification network predicts to belong to at least two different classes of objects. In some cases, the user provides the misclassified image to the system via a user device as described with reference to FIG. 1.

At operation 410, the system augments the misclassified image to obtain an augmented image. In some cases, the operations of this step refer to, or may be performed by, a data augmentation apparatus as described with reference to FIG. 2. In some cases, the data augmentation network obtains the augmented image based on the misclassified image as described with reference to FIG. 5.

At operation 415, the system provides the augmented image to the user. In some cases, the operations of this step refer to, or may be performed by, a data augmentation apparatus as described with reference to FIG. 2. In some cases, after obtaining the augmented image, the system returns the augmented image to the user via a user device as described with reference to FIG. 1. In some cases, the user can review the augmented image and use the augmented image to construct a training set for the classification network.

Figure 5:
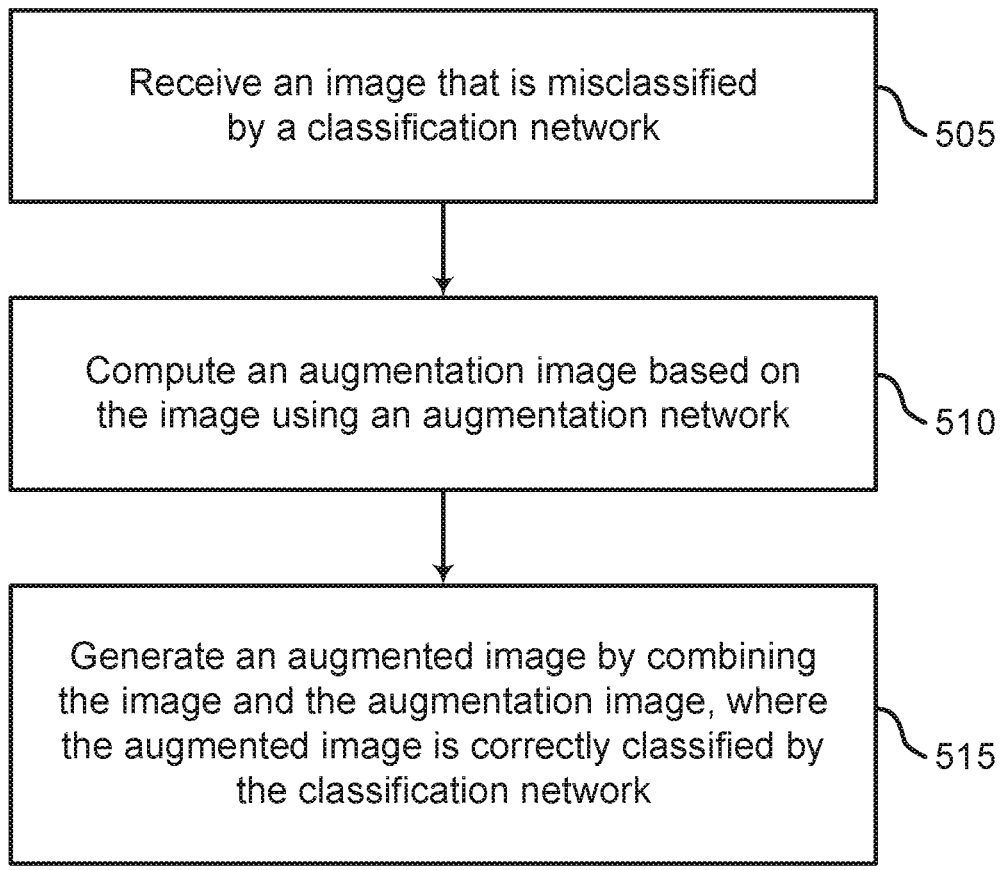
FIG. 5 shows an example of generating an augmented image according to aspects of the present disclosure.

FIG. 5 shows an example of generating an augmented image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, the system receives an image that is misclassified by a classification network, computes an augmentation image based on the image using an augmentation network, and generates an augmented image by combining the image and the augmentation image, where the augmented image is correctly classified by the classification network. By computing the augmented sample, the system thereby provides an easier image for the classification network to classify, allowing the classification network to learn from an easier sample rather than the more difficult original image. This would allow the classification network to be trained without manually collecting additional training samples for a training set or manually removing training images from the training set. In addition, both the augmented image and the original image can be used to construct a curriculum for the classification network, such that the classification network can be effectively "primed" by the augmented image to learn from the original ambiguous sample, thereby increasing the effectiveness of the classification network in making classifications based on ambiguous samples.

At operation 505, the system receives an image that is misclassified by a classification network. In some cases, the operations of this step refer to, or may be performed by, an augmentation network as described with reference to FIGS. 2 and 3.

According to some aspects, a classification network as described with reference to FIGS. 2 and 3 classifies the image to obtain a false label. In some cases, for a given object x depicted in an image that is input to the classification network θ, the classification network θ is trained to output a confidence score $\Theta=\{\theta(x)_i | i \in N\}$ that indicates a probability that the object belongs to a given class. In some cases, the classification network outputs multiple confidence scores Θ for a number of classes $C_h$ for the object x that are above a confidence threshold h: $C_h=\{\theta(x)_i > h | \theta(x)_i \in \Theta\}$. According to some aspects, a label is an annotation for an image that includes a confidence score, where the label is generated by the classification network and is associated with the image and the object by the classification network, and a false label is a label that includes multiple confidence scores that exceed the confidence threshold h. Examples of false labels are described with reference to FIGS. 6-7.

According to some aspects, the augmentation network receives the image that is misclassified by the classification network from a user, such as the user as described with reference to FIG. 1, from a database, such as the database as described with reference to FIG. 1, or from a different data source, such as the Internet, a website, etc. According to some aspects, the augmentation network receives the image that is misclassified by the classification network from the classification network in response to a determination that the image is misclassified.

At operation 510, the system computes an augmentation image based on the image using an augmentation network. In some cases, the operations of this step refer to, or may be performed by, an augmentation network as described with reference to FIGS. 2 and 3.

In some cases, an object is misclassified when a label associated with the object is a false label (e.g., a label that includes multiple confidence scores that exceed a confidence threshold). For example, in some cases, the object x is misclassified when $C_h \geq 2$. For example, if the classification network predicts with a confidence above a confidence threshold that an object belongs to two or more classes, the object is misclassified by the classification network. In some cases, an image including a misclassified object is a misclassified image. According to some objects, a misclassified image that includes a misclassified object x is referred to as an "ambiguous image".

According to some aspects, in response to the classification network generating a label, the determination component receives the label. According to some aspects, in response to receiving a false label, the determination component determines that the image associated with the false label is misclassified. Examples of misclassified images are described with reference to FIGS. 6-7.

According to some aspects, the determination component identifies the label for the image and selects the augmentation network from among a set of augmentation networks based on the label. For example, in some cases, the determination component receives the label and identifies a class corresponding to a confidence score included in the label. In some cases, determination component selects an augmentation network corresponding to the selected class from the set of augmentation networks. For example, in some cases, the selected augmentation network is an augmentation network that is trained to generate an augmented image for the image such that an object included in the augmented image is likely to be classified as belonging to the selected class.

According to some aspects, the augmentation network computes an augmentation image based on the determination that the image is misclassified. For example, in some cases, in response to the determination component determining that the image is misclassified, the determination component provides the image to the augmentation network. According to some aspects, in response to receiving the image, the augmentation network generates a class-specific augmentation for the image, and includes the class-specific augmentation in the augmentation image. According to some aspects, the class-specific augmentation for the image includes pixels such that when the augmentation image is combined with the image, the pixels would cause the classification network to correctly classify the object depicted in the combined image. Examples of augmentation images are described with reference to FIGS. 6-7.

At operation 515, the system generates an augmented image by combining the image and the augmentation image, where the augmented image is correctly classified by the classification network. In some cases, the operations of this step refer to, or may be performed by, an augmentation network as described with reference to FIGS. 2 and 3.

According to some aspects, the augmentation network adds the image to the augmentation image to obtain the augmented image. According to some aspects, the augmented image therefore depicts an augmented object that is modified from the object depicted in the image in such a manner that the augmented object is likely to be correctly classified by a classification network. Examples of augmented images are described with reference to FIGS. 6-7.

According to some aspects, the augmentation network provides the augmented image to the classification network, and the classification network correctly classifies the augmented object and therefore the augmented image to obtain a correct label for the augmented object and the augmented image. Examples of correct labels are described with reference to FIGS. 6-7.

According to some aspects, a training component trains the classification network based on the augmented image. For example, according to some aspects, the training component retrieves a training set comprising a training image and a target classification for the training image and trains the classification network based on the augmented image and the target classification by comparing the target classification with the correct label obtained by the classification network.

In some cases, the training component computes a classification loss based on the comparison according to a classification loss function, where the training component trains the classification network based on the classification loss. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, the training component trains the classification network by comparing the output of the classification network (e.g., a label for an augmented image) with a ground-truth label (e.g., the target classification included in the training set) and iteratively updating the parameters of the classification network according to the loss computed according to the classification loss function.

Figure 6:
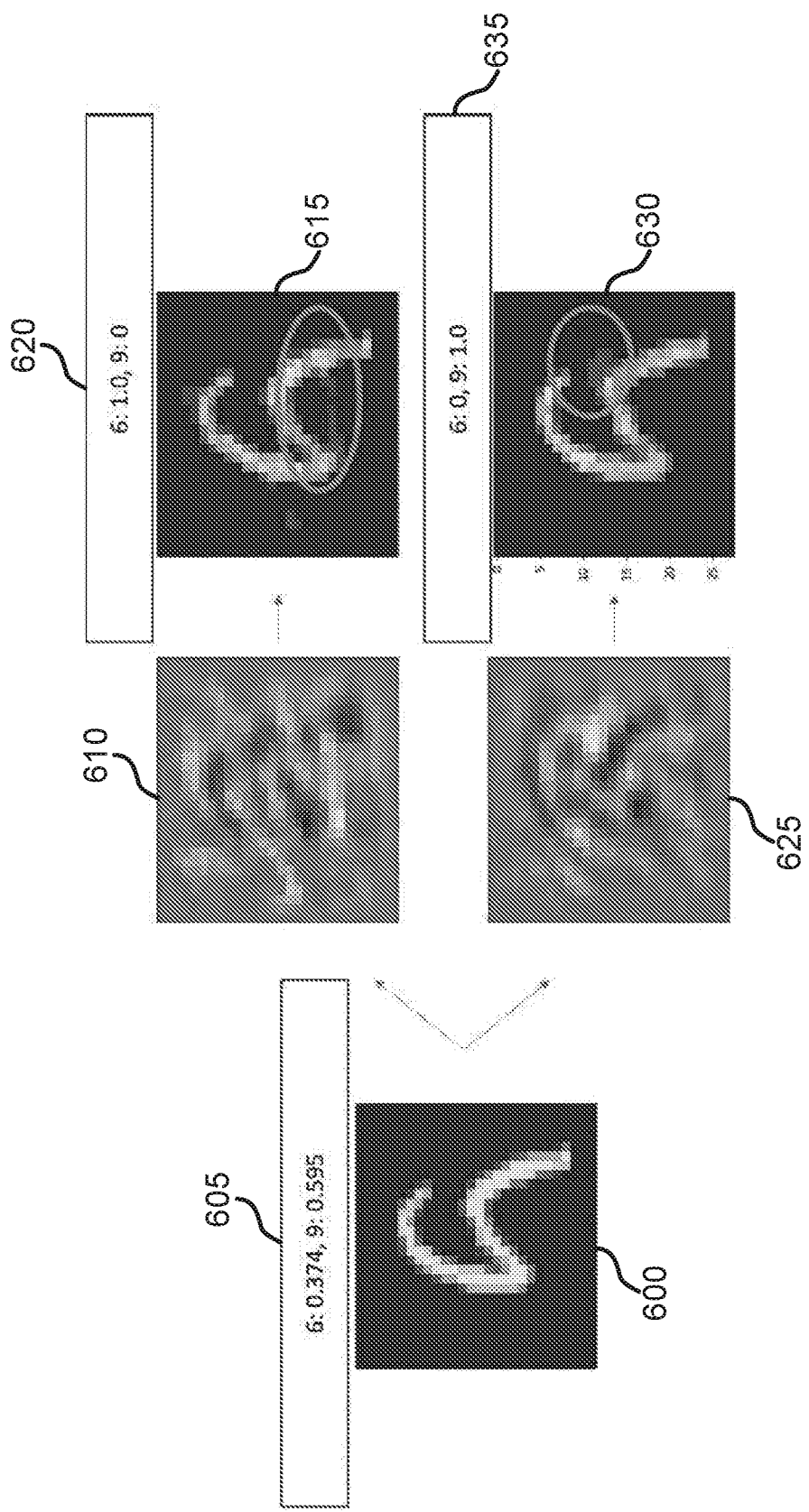
FIG. 6 shows a first example of augmented image classification according to aspects of the present disclosure.

FIG. 6 shows a first example of augmented image classification according to aspects of the present disclosure. The example shown includes first misclassified image 600, first false label 605, first augmentation image 610, first augmented image 615, first correct label 620, second augmentation image 625, second augmented image 630, and second correct label 635. First misclassified image 600 is an example of, or includes aspects of, the misclassified image described with reference to FIG. 3.

Referring to FIG. 6, first misclassified image 600 is misclassified because a classification network has predicted first false label 605 for first misclassified image 600. First false label 605 is a false label because it includes two confidence scores for an object included in first misclassified image 600 that exceed a confidence threshold. In this example, the classification network has classified the object depicted in first misclassified image 600 as a numeral "6" with a 0.374 confidence score and as a numeral "9" with a 0.595 confidence score.

According to some aspects, a determination component receives first misclassified image 600 and selects an augmentation network to generate an augmented image for first misclassified image 600 based on first false label 605. In this case, the determination component selects a first augmentation network corresponding to the classification of the object as the numeral "6" and a second augmentation network corresponding to the classification of the object as a numeral "9", and provides first misclassified image 600 to the first augmentation network and the second augmentation network.

In this case, the first augmentation network computes first augmentation image 610 in response to receiving first misclassified image 600, and generates first augmented image 615 by combining first misclassified image 600 and first augmentation image 610. The circled area in first augmented image 615 depicts a change from first misclassified image 600 to first augmented image 615 resulting from first augmentation image 610 that is likely to influence a classification network to correctly classify an object depicted in first augmented image 615 as a numeral "6". In this case, the classification network receives first augmented image 615 from the first augmentation network and processes first augmented image 615 to obtain first correct label 620 for first augmented image 615, including a confidence score of 1.0 that first augmented image 615 depicts a numeral "6", and a confidence score of 0 that first augmented image 615 depicts a numeral "9". In this case, first correct label 620 is correct because it does not include multiple confidence scores that exceed a confidence threshold.

Likewise, the second augmentation network computes second augmentation image 625 in response to receiving first misclassified image 600, and generates second augmented image 630 by combining first misclassified image 600 and second augmentation image 625. The circled area in second augmented image 630 depicts a change from first misclassified image 600 to second augmented image 630 resulting from second augmentation image 625 that is likely to influence the classification network to correctly classify an object depicted in second augmented image 630 as a numeral "9". In this case, the classification network receives second augmented image 630 from the second augmentation network and processes second augmented image 630 to obtain second correct label 635 for second augmented image 630, including a confidence score of 0 that second augmented image 630 depicts a numeral "6", and a confidence score of 1.0 that second augmented image 630 depicts a numeral "9". In this case, second correct label 635 is correct because it does not include multiple confidence scores that exceed a confidence threshold.

Figure 7:
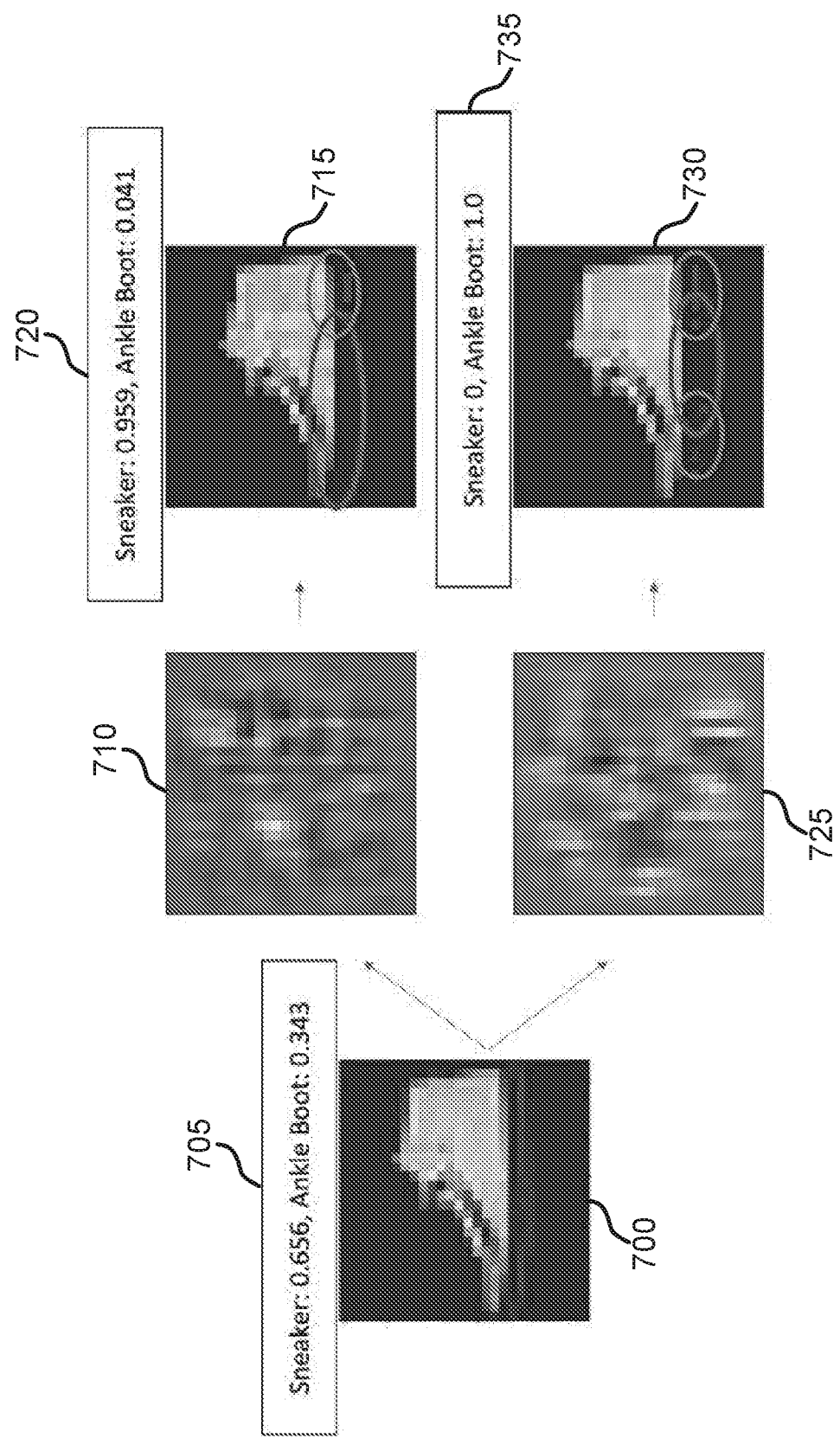
FIG. 7 shows a second example of augmented image classification according to aspects of the present disclosure.

FIG. 7 shows a second example of augmented image classification according to aspects of the present disclosure. The example shown includes second misclassified image 700, second false label 705, third augmentation image 710, third augmented image 715, third correct label 720, fourth augmentation image 725, fourth augmented image 730, and fourth correct label 735. Second misclassified image 700 is an example of, or includes aspects of, the misclassified image described with reference to FIG. 3.

Referring to FIG. 7, second misclassified image 700 is misclassified because a classification network has predicted second false label 705 for second misclassified image 700. Second false label 705 is a false label because it includes two confidence scores for an object included in second misclassified image 700 that exceed a confidence threshold. In this example, the classification network has classified the object depicted in second misclassified image 700 as a sneaker with a 0.656 confidence score and as an ankle boot with a 0.343 confidence score.

According to some aspects, a determination component receives second misclassified image 700 and selects an augmentation network to generate an augmented image for second misclassified image 700 based on second false label 705. In this case, the determination component selects a third augmentation network corresponding to the classification of the object as a sneaker and a fourth augmentation network corresponding to the classification of the object as an ankle boot, and provides second misclassified image 700 to the third augmentation network and the fourth augmentation network.

In this case, the third augmentation network computes third augmentation image 710 in response to receiving second misclassified image 700, and generates third augmented image 715 by combining second misclassified image 700 and third augmentation image 710. The circled area in third augmented image 715 depicts a change from second misclassified image 700 to third augmented image 715 resulting from third augmentation image 710 that is likely to influence a classification network to correctly classify an object depicted in third augmented image 715 as a sneaker. In this case, the classification network receives third augmented image 715 from the third augmentation network and processes third augmented image 715 to obtain third correct label 720 for third augmented image 715, including a confidence score of 0.959 that third augmented image 715 depicts a sneaker, and a confidence score of 0.041 that third augmented image 715 depicts an ankle boot. In this case, third correct label 720 is correct because it does not include multiple confidence scores that exceed a confidence threshold.

Likewise, the fourth augmentation network computes fourth augmentation image 725 in response to receiving second misclassified image 700, and generates fourth augmented image 730 by combining second misclassified image 700 and fourth augmentation image 725. The circled area in fourth augmented image 730 depicts a change from second misclassified image 700 to fourth augmented image 730 resulting from fourth augmentation image 725 that is likely to influence the classification network to correctly classify an object depicted in fourth augmented image 730 as an ankle boot. In this case, the classification network receives fourth augmented image 730 from the fourth augmentation network and processes fourth augmented image 730 to obtain fourth correct label 735 for fourth augmented image 730, including a confidence score of 0 that fourth augmented image 730 depicts a sneaker and a confidence score of 1.0 that fourth augmented image 730 depicts an ankle boot. In this case, fourth correct label 735 is correct because it does not include multiple confidence scores that exceed a confidence threshold.

Training an Augmentation Network

A method for data augmentation is described with reference to FIGS. 8-9. One or more aspects of the method include receiving a training set comprising a sample and a target prediction for the sample; computing an augmented sample based on the sample and the target prediction using an augmentation network; and training the augmentation network based on the sample, the augmented sample, and the target prediction.

Some examples of the method further include computing a discrimination value based on the augmented sample using a discriminator network. Some examples further include computing an augmentation loss based on the augmented sample and the discrimination value, wherein the augmentation network is trained based on the augmentation loss.

Some examples of the method further include training the discriminator network based on the discrimination value. Some examples of the method further include randomly selecting the target prediction from a set of prediction values. Some examples of the method further include selecting the augmentation network from a plurality of augmentation networks based on the target prediction.

Some examples of the method further include generating a predicted value for the sample using a prediction network. Some examples further include computing a cross-entropy loss based on the augmented sample and the predicted value, wherein the augmentation network is trained based on the cross-entropy loss. Some examples of the method further include freezing the prediction network while the augmentation network is trained. In some aspects, the augmentation network is a generator network of a generative adversarial network.

Some examples of the method further include determining a logarithm of a function of the sample, wherein the augmentation network is trained based on the logarithm of the function of the sample. Some examples of the method further include determining a logarithm of a function of the augmented sample, wherein the augmentation network is trained based on the logarithm of the function of the augmented sample. Some examples of the method further include determining a Euclidean norm of an augmented portion of the augmented sample, wherein the augmentation network is trained based on the Euclidean norm of the augmented portion.

Figure 8:
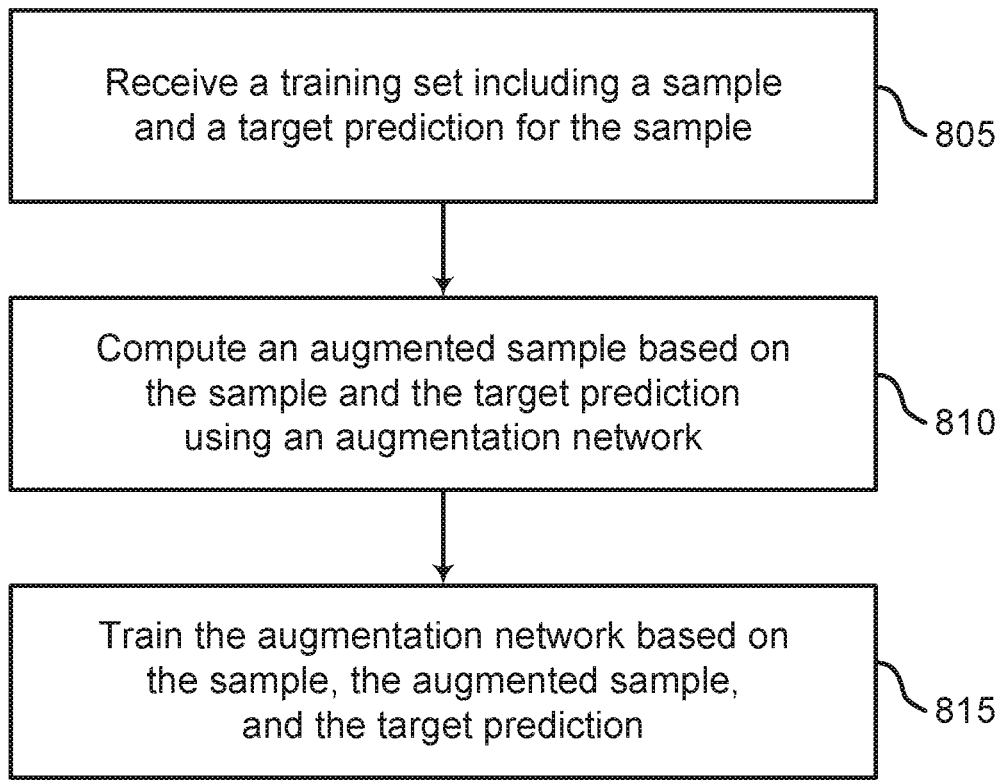
FIG. 8 shows an example of training an augmentation network according to aspects of the present disclosure.

FIG. 8 shows an example of training an augmentation network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, the system receives a training set including a sample and a target prediction for the sample, computes an augmented sample based on the sample and the target prediction using an augmentation network, and trains the augmentation network based on the sample, the augmented sample, and the target prediction. For example, in some cases, the sample is an ambiguous sample that corresponds to multiple prediction values that exceed a prediction value threshold. By teaching the augmentation network to compute an augmented sample for the ambiguous sample such that the prediction network would output a single prediction value for the augmented sample that exceeds a prediction threshold, the system thereby provides an easier training sample for a prediction network to learn from, rather than manually collecting additional training samples for the training set or manually removing training samples from the training set in an attempt to effectively train the prediction network. In addition, both the augmented training sample and the original sample can be used to construct a curriculum for the prediction network, such that the prediction network can be effectively "primed" by the augmented sample to learn from the original ambiguous sample, thereby increasing the effectiveness of the prediction network in making predictions based on ambiguous samples.

At operation 805, the system receives a training set including a sample and a target prediction for the sample. In some cases, the operations of this step refer to, or may be performed by, a training component as described with reference to FIGS. 2 and 3. In some cases, the training set D includes a sample x and a target prediction $c_i$. In some cases, the sample x comprises a signal, such as an image as described with reference to FIG. 5, an audio signal, or a video signal. In some cases, the training component retrieves the training set D from a database, such as the database as described with reference to FIG. 1. In some cases, a user provides the training set D to the training component via a user device and a user interface. In some cases, the training component provides the training set D to a determination component as described with reference to FIG. 2, and the determination component randomly selects the target prediction $c_i$ from a set of target predictions C. For example, in some cases, the target prediction $c_i$ is not a ground-truth prediction for the sample x.

According to some aspects, the determination component selects an augmentation network g from a set of augmentation networks $G=\{g_{\delta,c_j}|c_j \in C\}$ based on the target prediction $c_i$, where C is the set of all target predictions. In some cases, each augmentation network corresponds to each target prediction, thereby availing better class conditioning. According to some aspects, each augmentation network is a generator network of a generative adversarial network (GAN). For example, in some cases, each augmentation network shares a discriminator network of the GAN in common.

At operation 810, the system computes an augmented sample based on the sample and the target prediction using an augmentation network. In some cases, the operations of this step refer to, or may be performed by, an augmentation network as described with reference to FIGS. 2 and 3.

According to some aspects, the training component provides the sample x and the target prediction $c_i$ to the selected augmentation network g, and the selected augmentation network computes augmentation data $\delta=g_{\delta,c_j(x)}$ based on the target prediction $c_i$ and the sample x. In some cases, the augmentation data $\delta$ is a perturbation of the sample x such that the augmentation data is combined with the sample, the perturbation would cause a prediction network θ to provide a correct prediction value for an augmented sample comprising the sample x and the augmentation data $\delta$. An example of augmentation data is the augmentation image described with reference to FIG. 5. An example of a correct prediction value is a correct label as described with reference to FIG. 5.

According to some aspects, the selected augmentation network computes an augmented sample x+$\delta$ by combining the sample x and the augmentation data $\delta$, such that a prediction network is likely to provide a correct prediction value for the augmented sample x+$\delta$. An example of an augmented sample is the augmented image as described with reference to FIG. 5.

At operation 815, the system trains the augmentation network based on the sample, the augmented sample, and the target prediction. In some cases, the operations of this step refer to, or may be performed by, a training component as described with reference to FIG. 2. According to some aspects, the training component freezes the prediction network while the selected augmentation network is trained.

According to some aspects, a discriminator network d computes a discrimination value $\hat{x}=x+\delta$ based on the augmented sample x+$\delta$. According to some aspects, the discrimination value $\hat{x}$ is used by the training component to train the discriminator network d by increasing an error rate of the discriminator network d (for example, by producing a novel candidate that the discriminator network predicts is a real sample).

According to some aspects, the prediction network θ generates a predicted value $\theta(\hat{x})$ for the sample. According to some aspects, the training component computes a cross-entropy loss $L_{CE}(\theta(\hat{x}),c_i)$ based on the augmented sample x+$\delta$ and the predicted value $\theta(\hat{x})$. In some cases, the cross-entropy loss $L_{CE}(\theta(\hat{x}), c_i)$ ensures that the augmentation data $\delta$ is added so that the augmented sample x+$\delta$ is predicted to be an instance of the target prediction $c_i$. A cross-entropy loss measures a performance of a prediction model whose output is a probability value between 0 and 1. Cross-entropy loss increases as the predicted prediction value diverges from the target prediction. A perfect model would have a log loss of 0. According to some aspects, the training component trains the selected augmentation network based on the cross-entropy loss by iteratively updating the parameters of the augmentation network to minimize the cross-entropy loss.

According to some aspects, the training component determines a logarithm of a function of the sample $\log(d(x))$ such that the discriminator network understands the real sample. According to some aspects, the training component determines a logarithm of a function of the augmented sample $(1-d(\hat{x}))$ such that the selected augmentation network g is constrained to compute a realistic augmented sample $x+\delta$. According to some aspects, the training component determines $\|\delta\|_2$, a Euclidean norm of the augmentation portion of the augmented sample $x+\delta$ (e.g., the augmentation data $\delta$) such that the magnitude of the augmentation data $\delta$ is minimized.

According to some aspects, the training component computes an augmentation loss L based on the augmented sample $x+\delta$ and the discrimination value $\hat{x}$:

$$L = L_{CE}(\theta(\hat{x}), c_r) + \log(d(x)) + \log(1-d(\hat{x})) + \|\delta\|_2 \qquad (1)$$

According to some aspects, the training component trains the selected augmentation network g based on the augmentation loss L. An example of an algorithm for training a set of augmentation networks G is described with reference to FIG. 9.

Figure 9:
FIG. 9 shows an example algorithm for training a set of augmentation networks according to aspects of the present disclosure.

FIG. 9 shows an example algorithm for training a set of augmentation networks according to aspects of the present disclosure. The example shown includes training algorithm 900. In the example of FIG. 9, a training set D includes a set of images x.

Referring to FIG. 9, given a prediction network $\theta$ and the training set D, for each augmentation network g in a set of augmentation networks $G = \{g_{\delta, c_j} | c_j \in C\}$, and for each image x in the training set D, a determination component as described with reference to FIG. 2 selects a random target prediction $c_r$ from the set of target predictions C and selects an augmentation network g corresponding to the random target prediction $c_r$. The augmentation network computes a perturbation $\delta$ (e.g., an augmentation image) for the sample x and generates a modified image instance $x+\delta$ (e.g., an augmented image) and a corresponding discrimination value $\hat{x}$ for the sample x.

The training component computes an augmentation loss L and optimizes the weights of the selected augmentation network g and the discriminator network d using the augmentation loss L. The process repeats for a number of epochs (a hyperparameter for a number times that training algorithm 900 iterates through the training set D, such that one epoch means that each sample x in the training set D has had an opportunity to update the parameters of each augmentation network in the set of augmentation networks G), and the trained set of augmentation networks G is returned.

Training a Prediction Network

A method for data augmentation is described with reference to FIG. 10. One or more aspects of the method include receiving a training set comprising a sample and a target prediction for the sample; computing an augmented sample based on the sample and the target prediction using an augmentation network; and training a prediction network based on the augmented sample and the target prediction.

Some examples of the method further include generating a predicted value for the sample using the prediction network. Some examples further include computing a prediction loss for the prediction network by comparing the predicted value and the target prediction, wherein the prediction network is trained based on the prediction loss.

Some examples of the method further include computing augmentation data using the augmentation network. Some examples further include combining the sample with the augmentation data to obtain the augmented sample.

Figure 10:
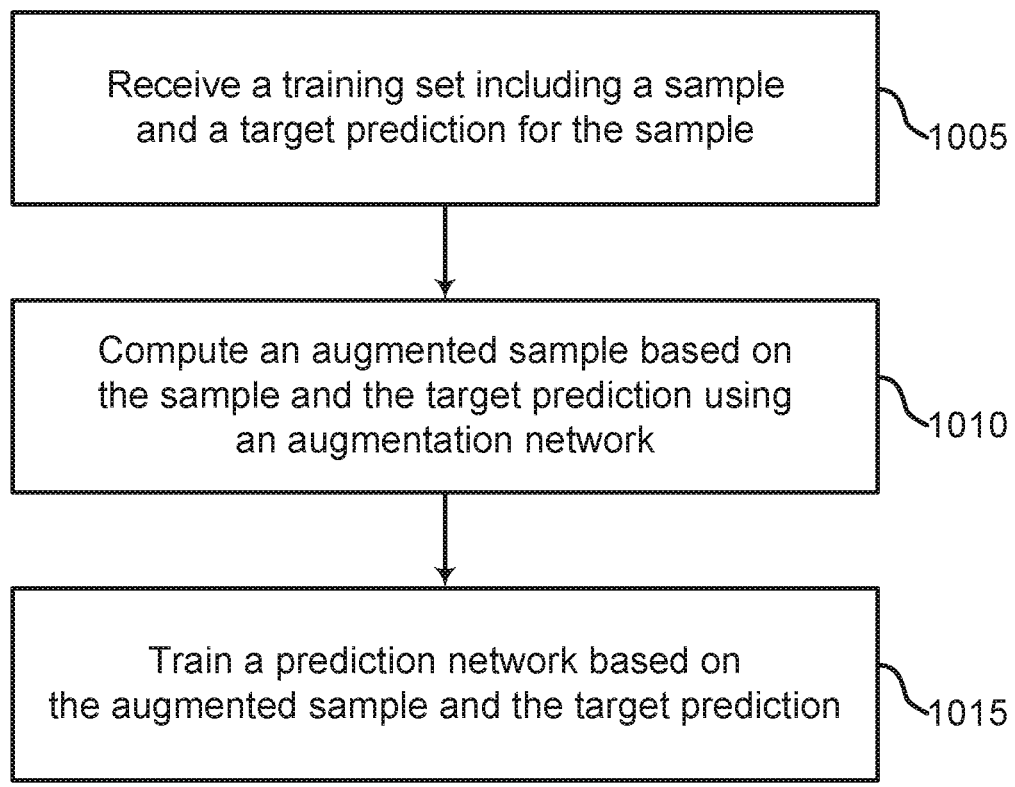
FIG. 10 shows an example of training a prediction network according to aspects of the present disclosure.

FIG. 10 shows an example of training a prediction network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, the system receives a training set including a sample and a target prediction for the sample, computes an augmented sample based on the sample and the target prediction using an augmentation network, and trains a prediction network based on the augmented sample and the target prediction. For example, in some cases, the sample is an ambiguous sample that corresponds to multiple prediction values that exceed a prediction value threshold. By computing an augmented sample for the ambiguous sample such that the prediction network would output a single prediction value for the augmented sample that exceeds a prediction threshold, and training the prediction network based on the augmented sample, the system thereby avoids a manual collection of additional training samples for the training set or a manual removal of training samples from the training set in an attempt to effectively train the prediction network. In addition, in a curriculum learning context, as the training of the prediction network proceeds using the augmented sample, the prediction network is then effectively "primed" to learn from the original ambiguous sample, thereby increasing the effectiveness of the prediction network in making predictions based on ambiguous samples.

At operation 1005, the system receives a training set including a sample and a target prediction for the sample. In some cases, the operations of this step refer to, or may be performed by, a training component as described with reference to FIGS. 2 and 3.

In some cases, the training set D includes a sample x and a target prediction $c_i$. In some cases, the sample x comprises a signal, such as an image as described with reference to FIG. 5, an audio signal, or a video signal. In some cases, the training component retrieves the training set D from a database, such as the database as described with reference to FIG. 1. In some cases, a user provides the training set D to the training component via a user device and a user interface. In some cases, the training component provides the training set D to a determination component as described with reference to FIG. 2, and the determination component randomly selects the target prediction $c_i$ from a set of target predictions C. For example, in some cases, the target prediction $c_i$ is not a ground-truth prediction for the sample x.

At operation 1010, the system computes an augmented sample based on the sample and the target prediction using an augmentation network. In some cases, the operations of this step refer to, or may be performed by, an augmentation network as described with reference to FIGS. 2 and 3.

According to some aspects, the training component provides the sample x and the target prediction $c_i$ to the selected augmentation network g, and the selected augmentation network computes augmentation data $\delta = g_{\delta, c_i(x)}$ based on the target prediction $c_i$ and the sample x. In some cases, the augmentation data $\delta$ is a perturbation of the sample x such that the augmentation data is combined with the sample, the perturbation would cause a prediction network $\theta$ to provide a correct prediction value for an augmented sample comprising the sample x and the augmentation data $\delta$. An example of augmentation data is the augmentation image described with reference to FIG. 5. An example of a correct prediction value is a correct label as described with reference to FIG. 5.

According to some aspects, the selected augmentation network computes an augmented sample $x+\delta$ by combining the sample x and the augmentation data $\delta$, such that a prediction network is likely to provide a correct prediction value for the augmented sample $x+\delta$. An example of an augmented sample is the augmented image as described with reference to FIG. 5.

At operation 1015, the system trains a prediction network based on the augmented sample and the target prediction. In some cases, the operations of this step refer to, or may be performed by, a training component as described with reference to FIG. 2.

For example, in some cases, the prediction network $\theta$ receives the augmented sample $x+\delta$ and generates a predicted value $\theta(x+\delta)$ for the sample. In some cases, the training component computes a prediction loss for the prediction network $\theta$ according to a prediction loss function by comparing the predicted value $\theta(x+\delta)$ and the target prediction $c_i$ and trains the prediction network $\theta$ based on the prediction loss. For example, during each training iteration, the predicted value $\theta(x+\delta)$ is compared to the known target prediction $c_i$. The prediction loss function provides a value (e.g., the prediction loss) for how close the predicted value $\theta(x+\delta)$ is to the actual target prediction $c_i$. After computing the prediction loss, the training component updates the parameters of the prediction network $\theta$ accordingly and a new set of predictions are made during the next iteration. Accordingly, the augmented sample $x+\delta$ transforms the sample x to increase the prediction network's understanding of the sample x, thereby avoiding the manual collection of additional training samples for training set D or the manual removal of training samples for training set D so that the prediction network $\theta$ can be trained.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data augmentation comprising:
receiving an image that is classified in a first class and a second class by a classification network;
identifying a first augmentation network corresponding to the first class and a second augmentation network corresponding to the second class;
computing a first augmentation image based on the image using the first augmentation network and computing a second augmentation image based on the image using the second augmentation network; and
generating a first augmented image by combining the image and the first augmentation image using the first augmentation network and generating a second augmented image by combining the image and the second augmentation image using the second augmentation network, wherein the first augmented image is classified in the first class by the classification network and the second augmented image is classified in the second class by the classification network.

2. The method of claim 1, further comprising:
classifying the image using the classification network to obtain a false label; and
determining that the image is classified in the first class and the second class based on the false label, wherein the first augmentation image and the second augmentation image are computed based on the determination.

3. The method of claim 1, further comprising:
training the classification network based on the first augmented image.

4. The method of claim 1, wherein:
the image depicts an object that is classified in the first class and the second class by the classification network, and wherein the first augmented image depicts a first augmented object that is classified in the first class by the classification network and the second augmented image depicts a second augmented object that is classified in the second class by the classification network.

5. The method of claim 1, further comprising:
identifying a label for the image; and
selecting the first augmentation network from among a plurality of augmentation networks based on the label.

6. A non-transitory computer readable medium storing code for data augmentation, the code comprising instructions that, when executed by at least one processor, cause the at least one processor to perform operations comprising:
receiving an image that is classified in a first class and a second class by a classification network;
identifying a first augmentation network corresponding to the first class and a second augmentation network corresponding to the second class;
computing a first augmentation image based on the image using the first augmentation network and computing a second augmentation image based on the image using the second augmentation network; and
generating a first augmented image by combining the image and the first augmentation image using the first augmentation network and generating a second augmented image by combining the image and the second augmentation image using the second augmentation network, wherein the first augmented image is classified in the first class by the classification network and the second augmented image is classified in the second class by the classification network.

7. The non-transitory computer readable medium of claim 6, the code further comprising instructions that, when executed by the at least one processor, cause the at least one processor to perform operations comprising:
classifying the image using the classification network to obtain a false label; and
determining that the image is classified in the first class and the second class based on the false label, wherein the first augmentation image and the second augmentation image are computed based on the determination.

8. The non-transitory computer readable medium of claim 6, the code further comprising instructions that, when executed by the at least one processor, cause the at least one processor to perform operations comprising:
training the classification network based on the first augmented image.

9. The non-transitory computer readable medium of claim 6, wherein:
the image depicts an object that is classified in the first class and the second class by the classification network, and wherein the first augmented image depicts a first augmented object that is classified in the first class by the classification network and the second augmented image depicts a second augmented object that is classified in the second class by the classification network.

10. The non-transitory computer readable medium of claim 6, the code further comprising instructions that, when executed by the at least one processor, cause the at least one processor to perform operations comprising:
identifying a label for the image; and
selecting the first augmentation network from among a plurality of augmentation networks based on the label.

11. A system comprising:
a memory component; and
a processing device coupled to the memory component, the processing device configured to perform operations comprising:
receiving an image that is classified in a first class and a second class by a classification network;
identifying a first augmentation network corresponding to the first class and a second augmentation network corresponding to the second class;
computing a first augmentation image based on the image using the first augmentation network and computing a second augmentation image based on the image using the second augmentation network; and
generating a first augmented image by combining the image and the first augmentation image using the first augmentation network and generating a second augmented image by combining the image and the second augmentation image using the second augmentation network, wherein the first augmented image is classified in the first class by the classification network and the second augmented image is classified in the second class by the classification network.

12. The system of claim 11, the processing device further configured to perform operations comprising:
classifying the image using the classification network to obtain a false label; and
determining that the image is classified in the first class and the second class based on the false label, wherein the first augmentation image and the second augmentation image are computed based on the determination.

13. The system of claim 11, the processing device further configured to perform operations comprising:
training the classification network based on the first augmented image.

14. The system of claim 11, wherein:
the image depicts an object that is classified in the first class and the second class by the classification network, and wherein the first augmented image depicts a first augmented object that is classified in the first class by the classification network and the second augmented image depicts a second augmented object that is classified in the second class by the classification network.

15. The system of claim 11, the processing device further configured to perform operations comprising:
identifying a label for the image; and
selecting the first augmentation network from among a plurality of augmentation networks based on the label.

* * * * *